(12) United States Patent
Monson

(10) Patent No.: US 6,304,610 B1
(45) Date of Patent: Oct. 16, 2001

(54) METHOD AND APPARATUS FOR SYNCHRONIZING TO A DATA STREAM FOR AN INDUCTIVELY COUPLED TRANSPONDER

(75) Inventor: Mark Brian Monson, Madison, WI (US)

(73) Assignee: SSI Technologies, Inc., Janesville, WI (US)

( * ) Notice: Subject to any disclaimer, the term of this patent is extended or adjusted under 35 U.S.C. 154(b) by 0 days.

(21) Appl. No.: 09/374,790

(22) Filed: Aug. 16, 1999

Related U.S. Application Data

(62) Division of application No. 08/824,322, filed on Mar. 26, 1997, now Pat. No. 5,939,977.
(60) Provisional application No. 60/014,763, filed on Apr. 3, 1996.

(51) Int. Cl.[7] .................................... H04L 27/00
(52) U.S. Cl. ............................................. 375/259
(58) Field of Search ........................... 375/259, 256, 375/257, 258; 327/1, 100

(56) References Cited

U.S. PATENT DOCUMENTS

| | | | |
|---|---|---|---|
| 4,064,482 | 12/1977 | Maisch et al. | 340/58 |
| 4,163,208 | 7/1979 | Merz | 340/58 |
| 4,628,739 | 12/1986 | Bruggen et al. | 73/702 |
| 4,663,719 | 5/1987 | Matsumoto et al. | 364/444 |
| 4,695,823 | 9/1987 | Vernon | 340/58 |
| 4,703,650 | 11/1987 | Dosjoub et al. | 73/146.5 |
| 4,717,905 | 1/1988 | Morrison, Jr. et al. | 340/58 |
| 4,726,233 | 2/1988 | Eckardt et al. | 73/727 |
| 4,731,727 | 3/1988 | Rauch et al. | 364/442 |
| 4,750,124 | 6/1988 | Lin et al. | 369/426 |
| 4,755,946 | 7/1988 | Lin | 364/426 |
| 4,761,996 | 8/1988 | Schmid et al. | 73/146.5 |
| 4,768,375 | 9/1988 | Eckardt et al. | 73/146.5 |

(List continued on next page.)

*Primary Examiner*—Chi Pham
*Assistant Examiner*—Kevin M. Burd
(74) *Attorney, Agent, or Firm*—Michael Best & Friedrcih LLP

(57) ABSTRACT

An apparatus and method of transmitting data between two inductively coupled circuits. The method includes providing a transmitting circuit, providing a receiving circuit spaced from the transmitting circuit, and generating a data signal in the transmitting circuit. The data signal includes a first component representing the data, and a second component identifying a portion of the first component. The apparatus includes a transmitting circuit having a transmitting coil. The transmitting circuit generates electrical energy in the transmitting coil. The apparatus further includes a receiving circuit spaced from and inductively coupled to the transmitting circuit. The receiving circuit includes modulating means for generating a carrier signal including a first component encoding a plurality of consecutive data signals, and a second component identifying the beginning of respective ones of the data signals.

9 Claims, 7 Drawing Sheets

U.S. PATENT DOCUMENTS

| | | | |
|---|---|---|---|
| 4,777,611 | 10/1988 | Tashiro et al. | 364/565 |
| 4,783,993 | 11/1988 | Lothar et al. | 73/146.5 |
| 4,790,179 | 12/1988 | Hettich et al. | 73/146.5 |
| 4,793,277 | 12/1988 | Haas et al. | 116/34 R |
| 4,823,107 | 4/1989 | Pompier | 340/442 |
| 4,837,553 | 6/1989 | Pompier | 340/442 |
| 4,845,649 | 7/1989 | Eckardt et al. | 364/571.02 |
| 4,891,973 | 1/1990 | Bollweber et al. | 73/146.5 |
| 4,911,217 | 3/1990 | Dunn et al. | 152/152.1 |
| 4,918,423 | 4/1990 | Fukuyama et al. | 340/442 |
| 4,938,272 | 7/1990 | Sandy, Jr. et al. | 152/427 |
| 4,942,510 | 7/1990 | Edwards | 363/127 |
| 4,943,123 | 7/1990 | Takeda et al. | 303/111 |
| 4,944,299 * | 7/1990 | Silvian | 455/100 |
| 4,951,502 | 8/1990 | Dörfler et al. | 73/146.5 |
| 4,954,677 | 9/1990 | Alberter et al. | 200/834 |
| 4,954,948 | 9/1990 | Hira et al. | 364/200 |
| 4,966,034 | 10/1990 | Bock et al. | 73/146.5 |
| 4,978,941 | 12/1990 | Brown | 340/447 |
| 4,998,092 | 3/1991 | Ohmo et al. | 340/448 |
| 4,999,783 | 3/1991 | Tenmoku et al. | 364/450 |
| 5,028,749 | 7/1991 | Hodate | 200/61.25 |
| 5,029,468 | 7/1991 | Dosjoub | 73/146.5 |
| 5,033,295 | 7/1991 | Schmid et al. | 73/146.5 |
| 5,035,137 | 7/1991 | Burkard et al. | 73/146.5 |
| 5,054,315 | 10/1991 | Dosjoub | 73/146.5 |
| 5,060,173 | 10/1991 | Tsuji | 364/551.01 |
| 5,061,917 | 10/1991 | Higgs et al. | 340/539 |
| 5,063,774 | 11/1991 | Burkard et al. | 73/146.5 |
| 5,065,134 | 11/1991 | Schmid et al. | 340/442 |
| 5,069,759 | 12/1991 | Hodate | 205/73 |
| 5,071,259 | 12/1991 | Metzger et al. | 374/143 |
| 5,083,457 | 1/1992 | Schultz | 73/146.5 |
| 5,090,237 | 2/1992 | Schrumpf et al. | 73/146.5 |
| 5,092,166 | 3/1992 | Wada et al. | 73/146 |
| 5,109,213 | 4/1992 | Williams | 340/447 |
| 5,134,880 | 8/1992 | Gerhard | 73/146.5 |
| 5,140,851 | 8/1992 | Hettich et al. | 73/146.5 |
| 5,141,294 | 8/1992 | Van Zanten et al. | 303/109 |
| 5,143,967 | 9/1992 | Krishnan et al. | 524/496 |
| 5,163,320 | 11/1992 | Goshima et al. | 73/146.5 |
| 5,181,423 | 1/1993 | Philipps et al. | 73/724 |
| 5,181,975 | 1/1993 | Pollack et al. | 152/152.1 |
| 5,193,387 | 3/1993 | Hodate | 73/146.5 |
| 5,218,861 | 6/1993 | Brown et al. | 73/146.5 |
| 5,218,862 | 6/1993 | Hurrell, II et al. | 73/146.5 |
| 5,228,337 | 7/1993 | Sharpe et al. | 73/146.5 |
| 5,228,758 | 7/1993 | Fujioka et al. | 303/111 |
| 5,231,872 | 8/1993 | Bowler et al. | 73/146.5 |
| 5,235,850 | 8/1993 | Schurmann | 73/146.5 |
| 5,239,469 | 8/1993 | Walker et al. | 364/424.03 |
| 5,285,189 | 2/1994 | Nowicki et al. | 340/447 |
| 5,289,160 | 2/1994 | Fiorletta | 340/447 |
| 5,292,184 | 3/1994 | Takata | 303/100 |
| 5,293,399 * | 3/1994 | Hefti | 340/10.34 |
| 5,293,919 | 3/1994 | Olney et al. | 152/418 |
| 5,297,424 | 3/1994 | Sackett | 73/146.5 |
| 5,301,553 | 4/1994 | Schultz et al. | 73/705 |
| 5,325,901 | 7/1994 | Olney et al. | 152/418 |
| 5,335,540 | 8/1994 | Bowler et al. | 73/146.5 |
| 5,341,687 | 8/1994 | Stan | 73/862.046 |
| 5,413,159 | 5/1995 | Olney et al. | 152/418 |
| 5,440,300 | 8/1995 | Spillman, Jr. | 340/825.54 |
| 5,442,553 | 8/1995 | Parrillo | 364/424.04 |
| 5,452,753 | 9/1995 | Olney | 152/417 |
| 5,460,037 | 10/1995 | Chamussy et al. | 73/146.3 |
| 5,463,374 | 10/1995 | Mendez et al. | 340/442 |
| 5,483,826 | 1/1996 | Schultz et al. | 73/146.5 |
| 5,602,524 | 2/1997 | Mock et al. | 340/447 |
| 5,663,496 | 9/1997 | Handfield et al. | 73/146.5 |
| 5,673,018 | 9/1997 | Lowe et al. | 340/445 |
| 5,939,977 * | 8/1999 | Monson | 340/442 |

* cited by examiner

METHOD AND APPARATUS FOR SYNCHRONIZING TO A DATA STREAM FOR AN INDUCTIVELY COUPLED TRANSPONDER

RELATED APPLICATIONS

This application is a Division of Ser. No. 08.824,322 filed Mar. 26, 1997, U.S. Pat. No. 5,939,977 and claims the benefit under 35 U.S.C. §119 of co-pending U.S. Provisional Patent Application Serial No. 60/014,763, filed Apr. 3, 1996, which issued as U.S. Pat. No. 5,939,977.

BACKGROUND OF THE INVENTION

The invention relates to a system for sensing a physical characteristic of a rotating wheel of a vehicle, and in particular, to a method and apparatus for encoding data indicating the pressure and temperature of the gas within the vehicle wheel.

It is commonly known to provide vehicles with wheels that include a tire, typically made of rubber or some other elastomeric material. The tire is usually hollow and is usually filled to a given pressure with a gas (commonly air). It is very important that the tire of the vehicle be inflated to the correct pressure for the particular tire. Improper inflation of a vehicle tire adversely effects the wear of the tire and diminishes the efficiency of the vehicle. Therefore, it is important that the vehicle operator check the tires on a regular basis to ensure proper inflation of the tires. However, the process of checking and adding to or subtracting from the air in the tire can be tedious and inconvenient for the typical motor vehicle operator. Moreover, the air pressure in a given tire can vary significantly depending upon the changes in the ambient temperature.

Various systems have been developed to make monitoring of tire pressure more convenient and easy. For example, U.S. Pat. No. 4,918,423 describes a tire inspection device for measuring the pressure and temperature of the air in the tire. The device includes a pressure sensor switch 9 connected to a coil 8, and a hand-held detecting rod 28. If the tire internal pressure has the proper value, the sensor 9 turns on and a green lamp on the detecting rod 28 lights. If the tire internal pressure has the improper value, the sensor 9 turns off and a red lamp on the detecting rod 28 lights.

Another example of a system for detecting tire pressure is shown and described in U.S. Pat. No. 4,768,375 (Eckardt et al.). The system illustrated in Eckardt et al. is passive in that it does not require a person to take any action to detect the tire pressure. The Eckardt et al. system can also detect tire pressure while the vehicle wheel is rotating.

SUMMARY OF THE INVENTION

The invention provides a system for remote tire pressure sensing that allows remote measurement of the tire pressure and temperature within a vehicle tire. The system utilizes low frequency magnitude field communication, eliminates cross talk between the wheels of the vehicle or the wheels of other vehicles, includes remote power transmission, provides identical transducers for each of the wheels (thereby rendering the wheels totally interchangeable), includes air detection capability, and measures actual pressure and actual temperature of the air in the tire.

The remote tire pressure sensing system includes a transponder mounted on the rim of the tire. The transponder includes a temperature sensor and a pressure sensor which measure the temperature and pressure, respectively, of the air in the tire. The remote tire pressure sensing system also includes a transceiver for each pair of tires on the vehicle. The transceiver is mounted on a frame member of the vehicle and includes a twisted wire pair going to each of the vehicle wheels. The twisted wire pairs are connected to a frame mounted transceiver coil. In a preferred embodiment of the invention, the transceiver coil is arcuately shaped so as the match the arc of the inner wall of the wheel rim. This maximizes the communication window between the transponder and the transceiver coil.

More particularly, the invention provides an apparatus including a transmitting circuit adapted to be mounted on the frame member. The transmitting circuit includes a transmitting coil and generates electrical energy in said transmitting coil. The apparatus also includes a receiving circuit adapted to be mounted on the vehicle wheel. The receiving circuit includes a sensor for measuring a physical characteristic of the vehicle wheel and modulating means connected to the sensor for generating a carrier signal including a first component encoding a plurality of consecutive data signals corresponding to the physical characteristic of the vehicle wheel, and a second component identifying the beginning of respective ones of the data signals.

It is an advantage of the invention to provide a system that provides remote measurement of the pressure and temperature of the air within a vehicle tire.

It is another advantage of the invention to provide a system for encoding and transmitting data between a transponder or transmitting circuit and a transceiver or receiving circuit that is in motion relative to the transponder.

It is another advantage of the invention to provide a method of encoding the data that allows the transceiver to synchronize to a given data packet.

Other features and advantages of the invention are set forth in the following detailed description and claims.

Figure 1:
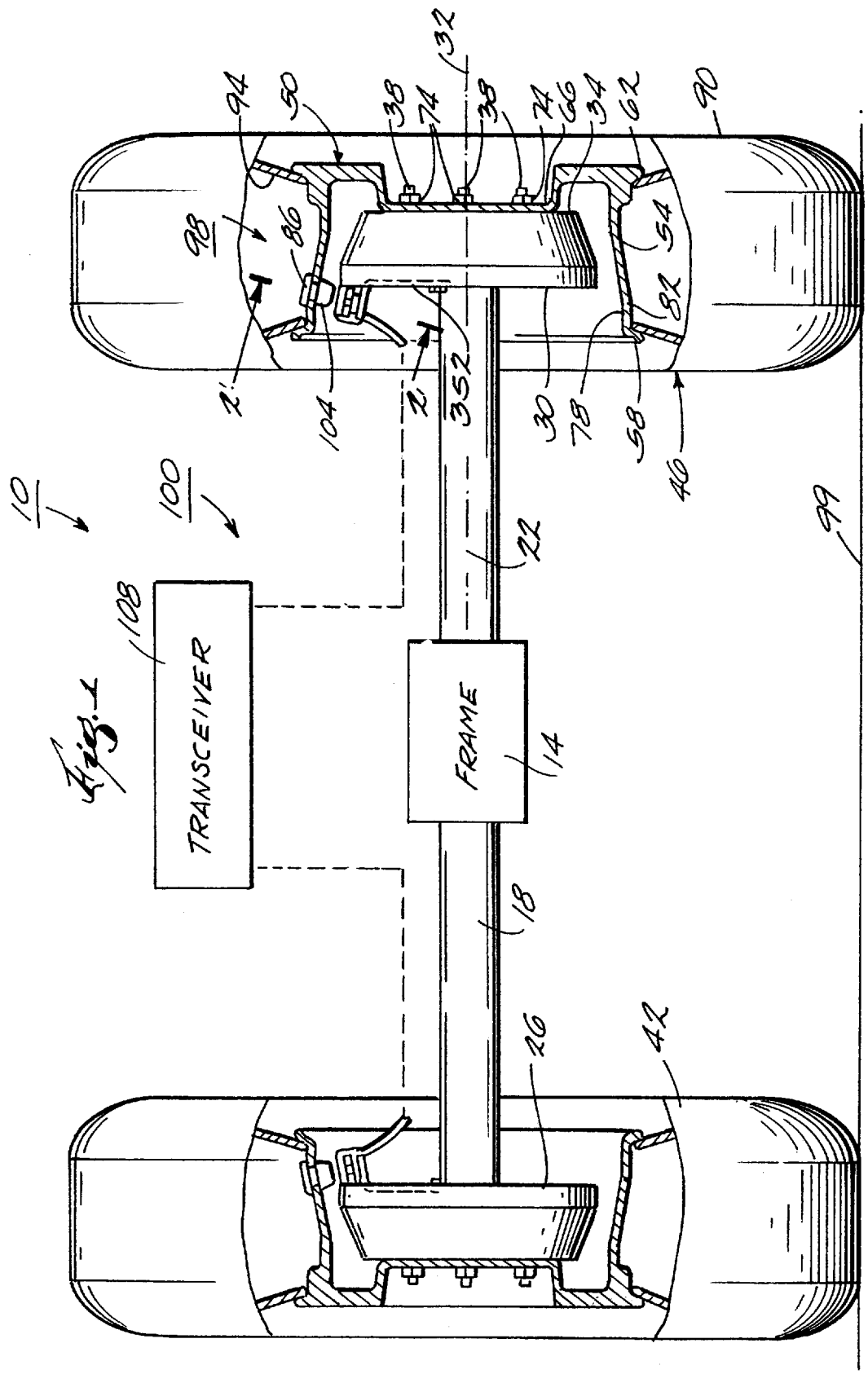
FIG. 1 is a partial schematic diagram of a vehicle including a system for remotely sensing the pressure and temperature of air in a vehicle tire.

Before one embodiment of the invention is explained in detail, it is to be understood that the invention is not limited in its application to the details of construction and the arrangement of Ccomponents set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DESCRIPTION OF THE PREFERRED EMBODIMENT

Shown in FIG. 1 of the drawings is a portion of a vehicle 10 embodying the invention. The vehicle 10 includes a frame 14 (only a portion of which is shown in FIG. 1) and a pair of frame members 18 and 22 each supporting a wheel end housing 26 and 30, respectively. As is commonly known in the art, the wheel end housings 26 and 30 are mounted for rotation relative to the frame members 18 and 22 about an axis 32. The wheel end housings 26 and 30 include a wheel mounting surface 34 and a plurality of threaded rods 38 extending axially from the mounting surface 34. The vehicle 10 also includes wheels 42 and 46 mounted on the wheel end housings 26 and 30, respectively. While only two wheels are shown mounted on the vehicle 10, as is commonly known in the art, the vehicle 10 can have any number of wheels in any of a variety of configurations. The number of wheels on the vehicle 10, as well as the particular construction of the frame members 18 and 22 and wheel end housings 26 and 30 may also vary depending upon the type of vehicle, e.g., automobile, truck or trailer, and may vary depending upon the type of drive used by the vehicle, e.g., rear wheel drive, front wheel drive, four wheel drive, etc.

As shown in the drawings, the wheels 42 and 46 are identical, and accordingly, only the wheel 46 will be described in detail. The wheel 46 includes a rim 50 having a cylindrical or drum-like portion 54. The cylindrical portion 54 has axially opposite end portions 58 and 62. The rim 50 also includes an end wall 66 adjacent the end portion 62. The end wall 66 has therein a series of apertures (not shown) for receiving threaded rods 38. The threaded rods 38 extend through the apertures on the rim 50 and lug nuts 74 are threaded onto the rods 38 to secure the rim 50 to the wheel end housing 30.

Figure 2:
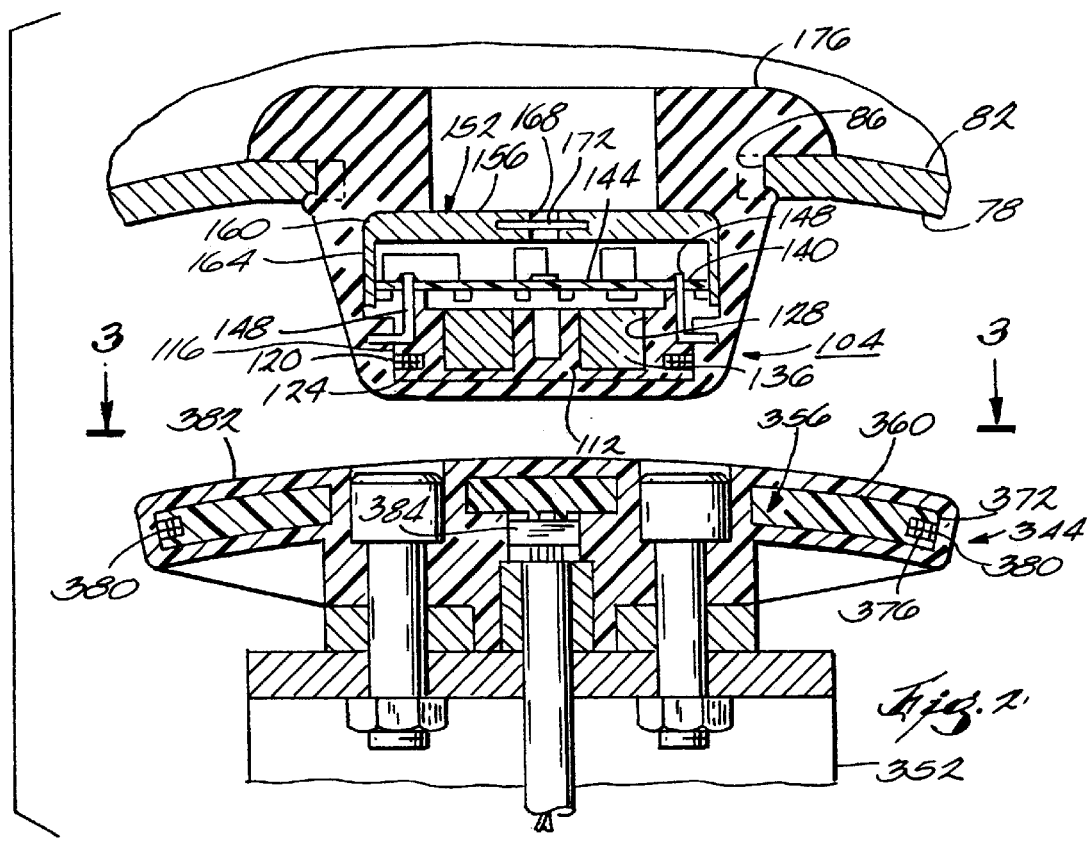
FIG. 2 is an enlarged view taken along line 2—2 in FIG. 1.

As best shown in FIG. 2, the cylindrical portion 54 of the rim 50 includes an inner surface 78, an outer surface 82 and an aperture 86 extending between the inner and the outer surfaces 78 and 82. Referring again to FIG. 1, the wheel 46 also includes a tire 90 mounted on the rim 50 adjacent the outer surface 82 of the cylindrical portion 54. As is commonly known in the art, the tire 90 is circular and extends around the rim 50. The tire 90 includes an inner surface 94 which, with the outer surface 82 of the rim 50, forms a cavity 98 that is typically inflated to a specified pressure with a gas or gas mixture such as air. The tire 90, along with the other tires of the vehicle 10, supports the vehicle 10 on the travelling surface 99.

The vehicle 10 also includes a system 100 for remotely sensing the pressure and temperature of the air in the cavity 98. In general terms, the system 100 includes a transponder 104 mounted in the aperture 86 of the rim 50 for rotation with the rim 50 about the axis 32, and a transceiver 108 mounted on the frame 14 so that the transceiver 108 is in a fixed reference relative to the wheel 46. As is commonly known in the art, power can be provided to the transceiver using virtually any electrical power supply. In the preferred embodiment, power is provided to the transceiver 108 by a +/−5.0 volt, 500 kHz switching power supply (not shown). While the system 100 is described in the context of a system for remotely sensing the pressure and temperature of air in a vehicle wheel, it should be understood that the system 100 can be used in any environment where it is desired to transfer data of any kind between inductively coupled circuits or through other wireless short range communications such as, for example, radio frequency identification tags.

As shown in FIG. 2 of the drawings, the transponder 104 includes a molded plastic bobbin 112. The bobbin 112 is circular in shape and has an outer surface 116 defining a recess 120. A wire conductor is wound around the bobbin 112 to form an inductive coil 124 in the recess 120. The bobbin 112 also includes an inner surface 128 defining a circular aperture. A circular ferrite pole piece 136 is mounted in the aperture. The bobbin 112 also includes a top surface 140. An electronic circuit or circuit assembly 144 is mounted on the top surface 140.

The transponder 104 also includes electrically conductive leads 148 mounted in the bobbin 112 and extending between the circuit assembly 144 and the inductive coil 124 to electrically connect the inductive coil 124 to the circuit assembly 144. A cap 152 is mounted on the top surface 140 of the bobbin 112 to enclose the circuit assembly 144. The cap 152 includes a disk-like top-portion 156 having an outer edge 160 and a cylindrical sidewall 164 extending downwardly from the outer edge 160. The cylindrical sidewall 164 engages the top surface 140 of the bobbin 112 so that the cap 152 covers the circuit assembly 144. The top-portion 156 of the cap 152 includes an aperture or port 168 to allow the pressure and temperature of air in the cavity to reach the circuit assembly 144. A filter 172 is mounted in the port to prevent dirt and debris from coming into contact with the circuit assembly 144. The cap 152 and bobbin assembly are encased within a molded rubber housing 176. The molded rubber housing 176 is resilient so that it can be forced into the aperture 86 of the rim 50 to form a seal therewith.

Figure 4:
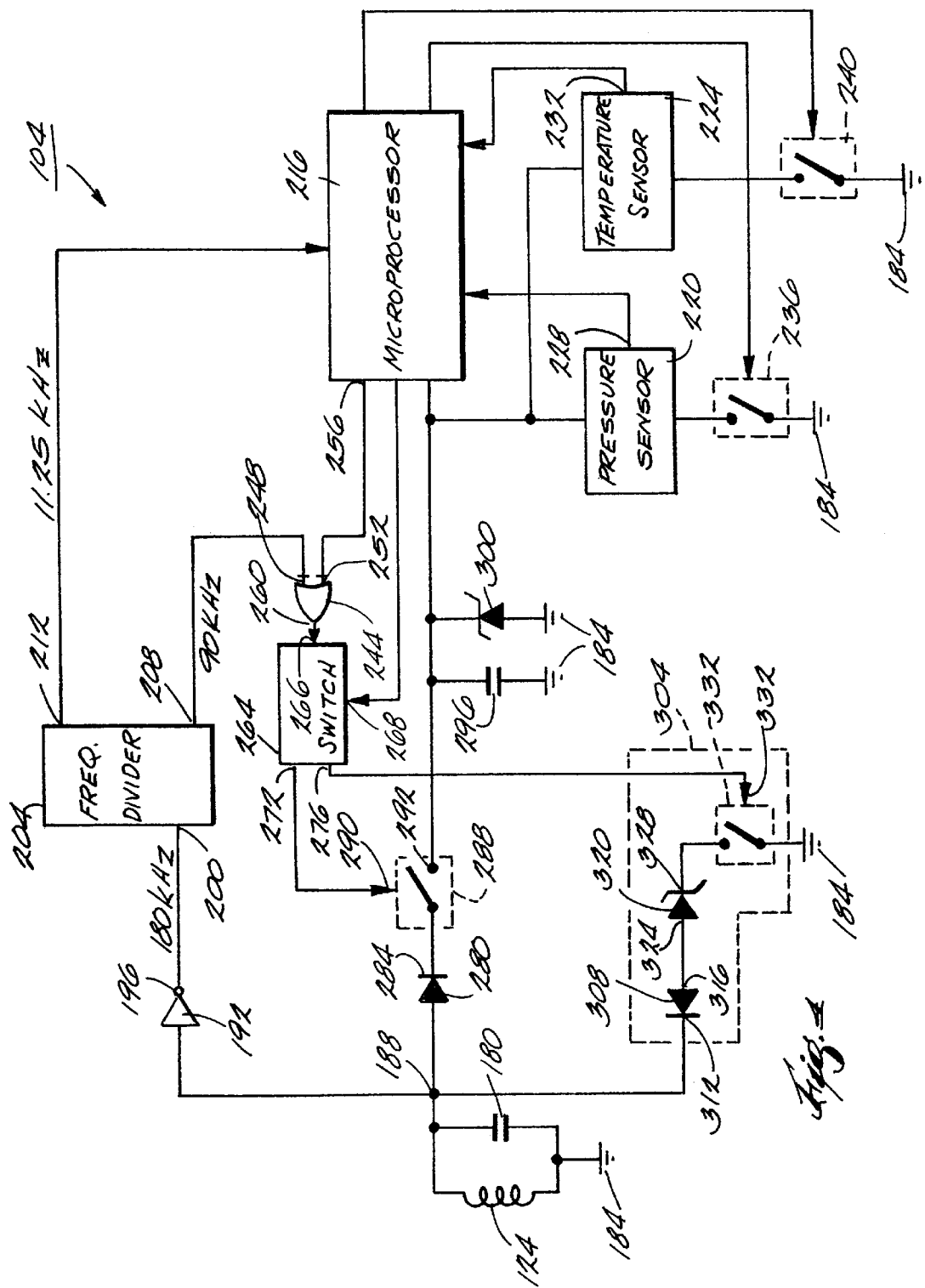
FIG. 4 is an electrical schematic diagram of the transponder of the system.

FIG. 4 is an electrical schematic of the transponder 104. As shown in FIG. 4 the inductive coil 124 forms an antenna for the circuit 144 and a capacitor 180 is connected in parallel with the inductive coil 124 so that one end of the capacitor and inductive coil combination forms a virtual ground 184. The capacitor 180 and inductive coil 124 form a resonant circuit. The opposite end of the parallel combination is connected to a node 188. An inverting Schmitt Trigger 192 is connected to node 188 and includes an output 196 connected to the input 200 of a frequency divider 204. The frequency divider 204 has two outputs 208 and 212. The output 208 is a "divide by two" output. The output 212 is a "divide by sixteen" output.

The transponder 104 includes a microprocessor 216 connected to the output 212. In the preferred embodiment, the microprocessor 216 is a PIC16C74 microprocessor and, as is commonly known in the art, the microprocessor 216 includes an analog-to-digital converter ("ADC") and a serial communications interface ("SCI"). The SCI is set up for synchronous slave mode operation and 9 bit data communication and utilizes the 11.25 kHz signal to shift data out of the SCI registers (not shown).

The transponder 104 also includes a pressure sensor 220 and a temperature sensor 224 mounted appropriately so that the pressure sensor 220 can measure the pressure of the air in the cavity and so that the temperature sensor 224 can measure the temperature of the air in the cavity. The pressure sensor 220 is preferably a silicon surface micro-machined integrated circuit pressure sensor as shown and described in U.S. Pat. No. 5,507,171, which is incorporated herein by reference. The temperature sensor 224 is preferably an integrated circuit temperature sensor as shown and described in U.S. patent application Ser. No. 08/286,784, titled "Method and Apparatus for Measuring Temperature", which is incorporated herein by reference. The pressure sensor 220 and temperature sensor 224 each have an output, 228 and 232, respectively, connected to the microprocessor 216. The pressure sensor 220 and the temperature sensor 224 are also connected to the virtual ground 184 through switches 236 and 240, respectively. The operation of the switches 236 and 240 is controlled by the microprocessor 216 to enable sampling of the pressure and temperature by the pressure sensor 220 and temperature sensor 224, respectively.

The transponder 104 also includes an exclusive "LOR" ("XOR") gate 244 having two inputs 248 and 252. The first input 248 is connected to the output (i.e., the "divide by two" output) of the frequency divider 204. The second input 252 is connected to the SCI output 256 of the microprocessor 216. XOR gate 244 also includes an output 260 upon which is generated a modulation signal for carrying data encoded by the microprocessor 216. While any appropriate modulation scheme can be used, the modulation signal output by the XOR gate 244 shown in the drawings is bipolar phase shift keyed ("IBPSK") at 90 kHz. The output 260 is connected to a switch select controller 264 through input 266. The switch select controller 264 also has an input 268 connected to the microprocessor 216 and includes outputs 272 and 276. The switch select controller 264 uses the BPSK signal to generate a quadrature phase shift keyed ("QPSK") signal at 90 kHz by selecting either switch 288 or 332 at the appropriate time.

The transponder 104 also includes a rectifying diode 280 connected to node 188. The diode 280 includes a cathode 284 connected to a switch 288. The switch 288 includes a control terminal 290 connected to the output 272 of switch select controller 264 and an opposite terminal 292 connected to the virtual ground 184 through capacitor 296 and zener diode 300. The capacitor 296 and zener diode 300 form a voltage supply for the transponder 104.

The transponder 104 also includes a diode 308 having a cathode 312 connected to the node 188 and having an anode 316. The transponder 104 also includes zener diode 320 having an anode 324 connected to the anode 316 of diode 308 and a cathode 328 connected to the virtual ground 184 through switch 332. The output 276 of switch select controller 264 is connected to the control input 336 of the switch 332. Together, diode 280, switch 288, diode 308, zener diode 320 and switch 332 form a modulation block 304 for the transponder.

Figure 3:
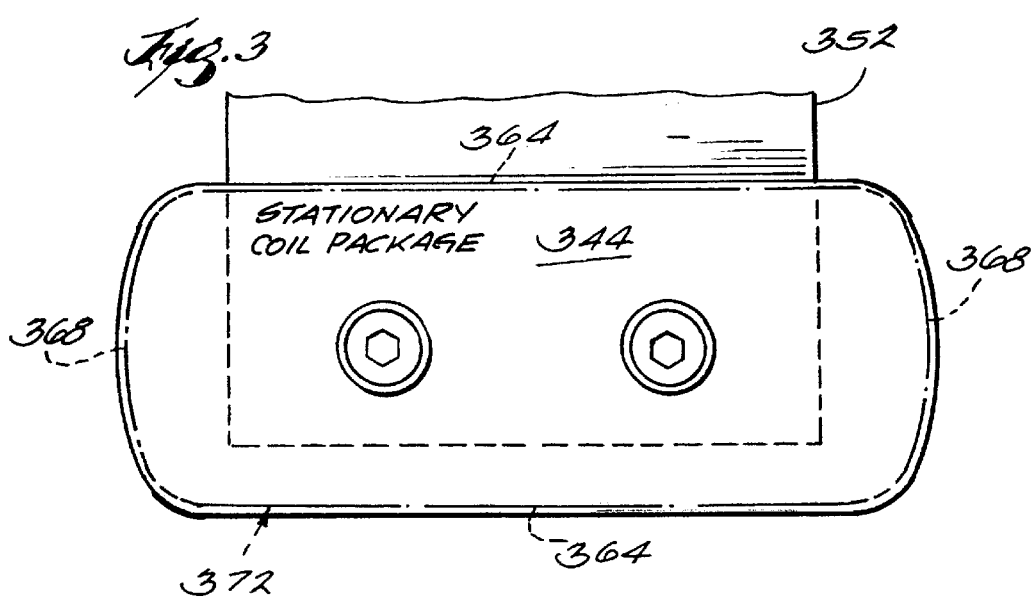
FIG. 3 is a view taken along line 3—3 in FIG. 2.

As shown in FIG. 1 of the drawings, the system 100 also includes a transceiver 108. For each wheel of the vehicle 10, the transceiver 108 includes a transceiver circuit 340 (shown in FIG. 5) and a stationary coil package 344 connected to the transceiver circuit 340 via a twisted pair of electrical conductors 348. As shown in FIGS. 2 and 3 the stationary coil package 344 is mounted on the frame member 22 via bracket 352 and using appropriate hardware as shown in FIGS. 2 and 3. The stationary coil package 344 includes a bobbin 356 having an arcuate, or generally non-planar surface 360. The arcuate contour of the surface 360 is approximately the same as the arcuate contour of the rotational pathway of the transponder 104 as the transponder 104 rotates about the axis 32 so that, as the transponder 104 rotates past the stationary coil package 344, a virtually constant radial air gap is maintained between the transponder 104 and the stationary coil package 344. In the preferred embodiment, the radius of curvature of the surface 360 is approximately 174 mm (to accommodate different rim sizes) and the arc length of the surface 360 is approximately 77 mm.

Figure 5:
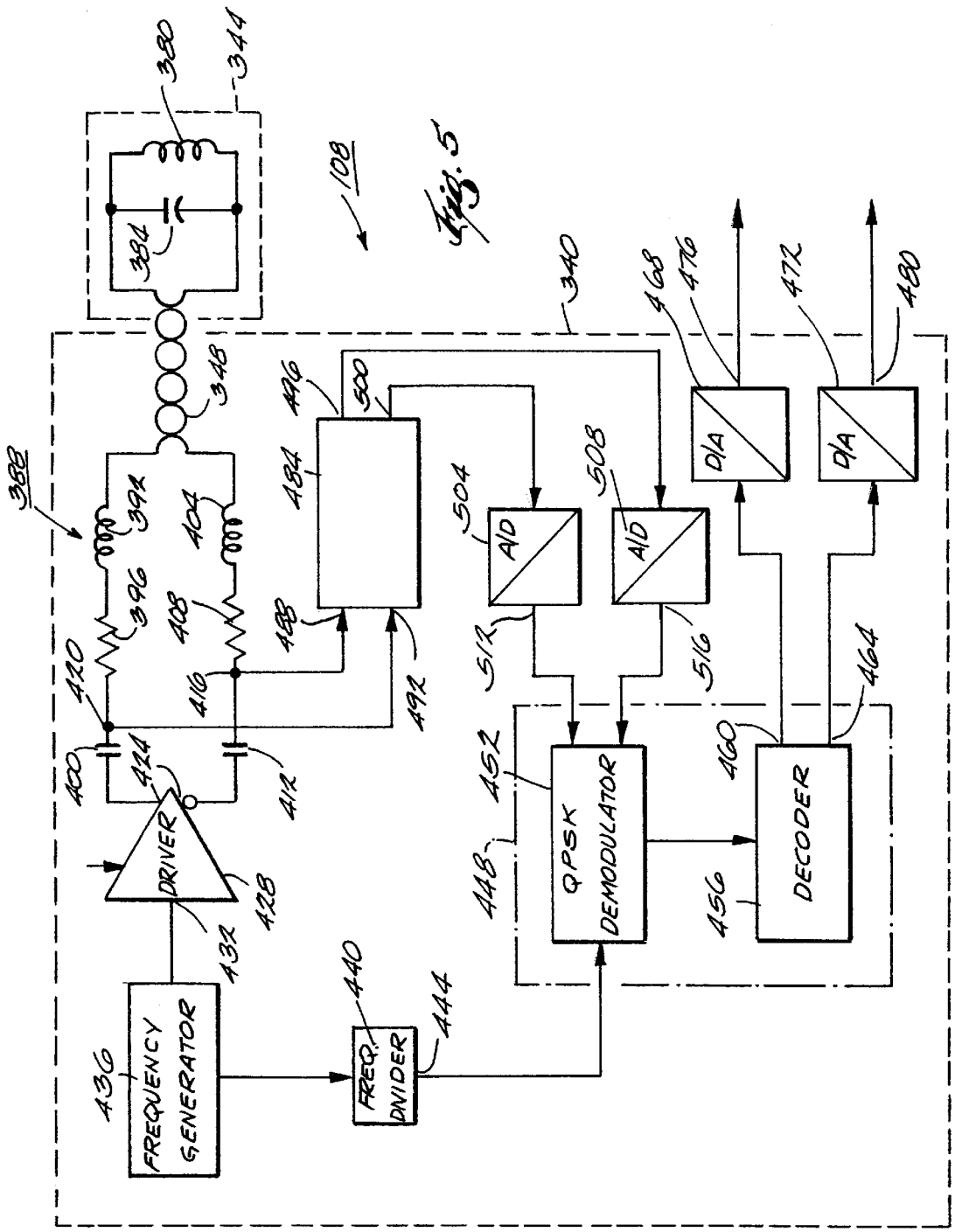
FIG. 5 is an electrical schematic diagram of the transceiver of the system.

As shown in FIG. 3, the bobbin 356 has a substantially rectangular shape and includes parallel side portions 364 and arcuate end portions 368, which, together with the side portions 364, form an endless side surface 372. The side surface 372 defines an aperture 376 (FIG. 2). The stationary coil package 344 includes a wire conductor wound around the bobbin 356 in the aperture 376 to form an inductive antenna coil 380 that, as viewed from the perspective shown in FIG. 2, follows the arcuate shape of the surface 360. The bobbin is over-molded with a thermoplastic or other appropriate material to form a housing 382 which protects the stationary coil package 344. The arcuate shape of the surface 360 and the inductive antenna coil 380 maximizes the communication window between the inductive antenna coil 380 and the inductive coil 124 of the transponder 104. That is, the amount of time during which the inductive antenna coil 380 and the inductive coil 124 of the transponder 104 are inductively coupled is increased. The stationary coil package 344 also includes a capacitor 384 connected in parallel to the inductive antenna coil 380 to form a resonant circuit. As shown in FIG. 5, the twisted pair of electrical conductors 348 are connected to the parallel combination of the inductive antenna coil 380 and capacitor 384.

Referring to FIG. 5, the transceiver circuit 340 includes an H-bridge filter 388 connected to the twisted pair of conductors 348. The H-bridge filter 388 is a two-pole band-pass filter that is used to simultaneously transmit power to the transponder 104 and receive data signals from the transponder 104. The H-bridge filter 388 includes a first leg having a serially-connected inductor 392, resistor 396 and capacitor 400 and second leg including a serially connected inductor 404, resistor 408 and capacitor 412. The legs include nodes 416 and 420 between the respective capacitors, 400 and 412, and resistors, 396 and 408. As shown in FIG. 4, the capacitors 400 and 412 are connected to the outputs 424 of an H-bridge driver 428. The H-bridge filter 388 maximizes the current through the inductive antenna coil 380 and is split into a differential configuration to increase the noise rejection of the system 100. Any external noise picked up by the H-bridge filter 388 will cancel itself out as a result of the differential configuration of the H-bridge filter 388. Moreover, the filter 388 reduces the harmonic content from the H-bridge driver 428 and also prevents damage to the H-Bridge filter 388 in the event of a short on the twisted pair of conductors 348.

The driver 428 includes an input 432 connected to a system clock or frequency generator 436 that outputs to the driver 428 an approximately 180 kHz (actually 179.7 kHz) square wave drive signal. As a result, the H-bridge driver 428 outputs to the H-bridge filter 388 a large sinusoidal voltage resulting in an approximately 25 volt peak (17.7 volt RMS) power supply across the antenna coil 380.

The regulator 436 also is connected to a frequency divider 440 that divides the 180 kHz signal to an approximately 90 kHz (actually 89.85 kHz) transceiver reference signal. The transceiver reference signal consists of two approximately 90 kHz. signals with a 90 degree phase shift between them obtained by dividing the 180 kHz (actually 179.7 kHz) drive frequency. The frequency divider 440 includes an output 444 connected to a digital signal processor 448. The digital signal processor 448 includes a QPSK demodulator 452 for receiving the reference signal. The QPSK demodulator 452 operates by comparing the phase of the reference signal with the phase of the signal received from the transponder 104. The digital signal processor 448 also includes a decoder 456 connected to the demodulator 452. The decoder 456 includes a pair of outputs 460 and 464 connected to digital-to-analog converters, 468 and 472, respectively. The digital-to-analog converters 468 and 472 have analog outputs, 476 and 480 respectively. The analog output 476 generates an analog signal related to the temperature of the air in the wheel 46 and the analog output 480 generates an analog signal related to the pressure of the air in the wheel 46.

The transceiver circuit 340 also includes a down converter 484. The down converter 484 has two inputs 488 and 492. The input 488 is connected to node 416 and the input 492 is connected to node 420. The down converter 484 changes the signals from a modulated 90 kHz carrier into two base band signals that represent the in-phase and quadrature components of the transferred signal. The down converter 484 includes outputs 496 and 500. The outputs 496 and 500 are connected to A/D converters 504 and 508, respectively. The A/D converters 504 and 508 include respective outputs 512 and 516, each of which are connected to the QPSK demodulator 452 of the digital signal processor 448.

In operation, the system clock 436 generates a 180 kHz square wave drive signal that is simultaneously supplied to the H-bridge driver 428 and to the "divide by two" frequency divider 440. The frequency divider 440 outputs the 90 kHz reference signal for the QPSK demodulator 452. The 180 kHz drive signal is supplied via the H-bridge filter 388 to the antenna coil 380. As the vehicle 10 moves along the traveling surface 99, the wheel 46 rotates and the rim mounted transponder 104 rotates with the wheel 46. When the transponder 104 rotates to a position where it is adjacent the stationary coil package 344 of the transceiver 108, the inductive coil 124 and the antenna coil 380 are inductively coupled and the 180 kHz drive signal at approximately 25 volts RMS is transmitted to the inductive coil 124. The drive signal is half-wave rectified by diode 280 and the resulting d.c. voltage is stored in capacitor 296 whenever switch 288 is closed to provide power to the transponder circuit 144. Simultaneously, the drive signal is input to inverting Schmitt Trigger 192 which outputs a 180 kHz square wave that is transmitted to the frequency divider 204. The frequency divider 204 outputs a 90 kHz signal to XOR gate 244 and outputs a 11.25 kHz signal to microprocessor 216.

The microprocessor 216 receives the 11.25 kHz signal as well as pressure and temperature data from the pressure and temperature sensors 220 and 224, respectively. The microprocessor 216 features a sleep mode to reduce the power requirements for the microprocessor 216. While in the sleep mode, only the peripheral hardware devices, e.g., the SCI and the ADC, of the microprocessor 216 are enabled. This can be done because the ADC functions and the SCI functions require most of the operating time of the microprocessor 216. In a typical processing cycle, the microprocessor 216 determines which ADC measurement should be taken, i.e., pressure or temperature, and initiates the ADC measurement. The processing circuitry of the microprocessor 216 enters the sleep mode, and the ADC measurement continues without any assistance from the processing circuitry of the microprocessor 216. When the ADC measurement is complete, an interrupt is generated which awakens the processing circuitry of the microprocessor 216. The processing circuitry then processes the data, prepares the data for transmission, initiates the transmission and again enters the sleep mode. After the transmission is complete, another interrupt is generated which awakens the processing circuitry to begin the cycle again.

The microprocessor 216 acquires data and generates data output signals using a transponder interrupt service routine software algorithm ("ISR"). The transponder ISR performs the bulk of the work in the transponder 104 and is called whenever the transmit register is empty. The purpose of the transponder ISR is to acquire a new sensor reading and to transmit the sensor reading via the SCI to the transceiver 108.

Although the SCI is set for 9 bot data transmission, the SCI can simulate transmission of an 18 bit data word or packet by transmitting two consecutive 9 bit data words. The microprocessor 216 keeps track of which half of the 18 bit data word has been sent via a high/low packet flag (not shown). The eighteen bit data word includes, in order, a first reference bit, eight synchronization bits, eight data bits and a final reference bit. The first reference bit is a synchronization bit which indicates the beginning of the eighteen bit data word. The synchronization bits provide information that allows the transceiver 108 to synchronize to and decode the data word. The data bits represent the digital value of the physical characteristic, i.e., pressure, temperature, etc., of the vehicle wheel, and the final reference bit indicates the end of the data word. Seventeen bits of the eighteen bit data word are transmitted in the I-channel.

The first reference bit is transmitted in the quadrature or Q-channel. The Q-channel first reference bit indicates the beginning of the data packet and allows error checking to be conducted by the transceiver 108. It should be understood that reference bits, synchronization bits and the data bits indicating the physical characteristic of the vehicle wheel can be encoded in either the I-channel or the Q-channel and can be arranged in any format that allows the data word to be decoded by the transceiver 108. Moreover, the synchronization bits in the eighteen bit data word can be eliminated if it is determined that the system is operating reliably without both the first reference bit and the synchronization bits. If the synchronization bits in the eighteen bit data word are eliminated, they can be replaced with additional data bits representing a physical characteristic of the vehicle wheel.

Figure 8:
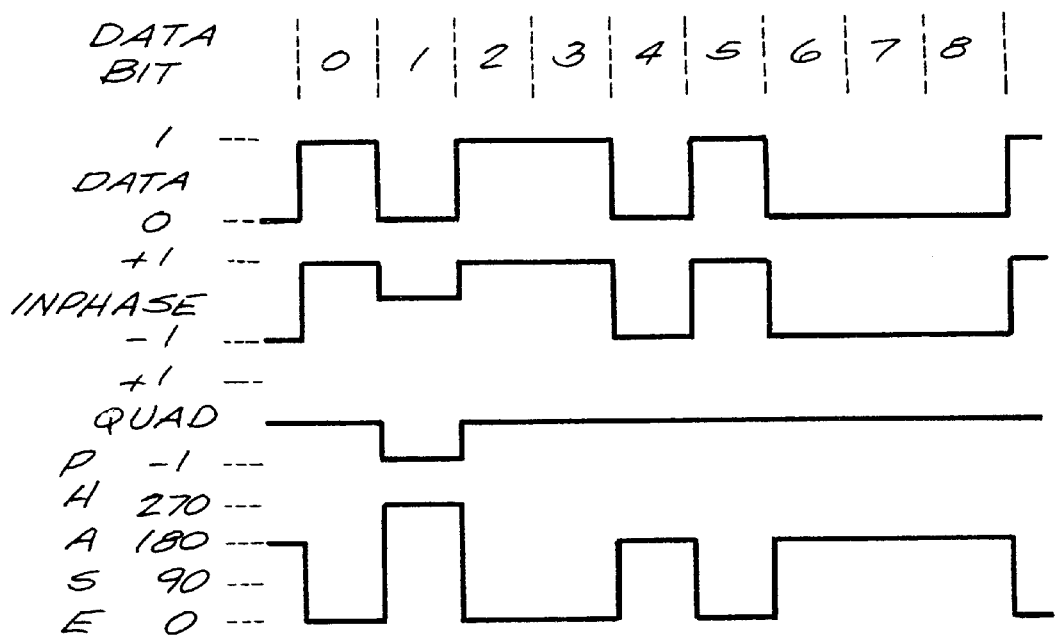
FIG. 8 is a waveform diagram illustrating an example of quadrature phase shift keyed ("QPSK") encoding.

FIG. 8 illustrates an example of QPSK data encoding. As shown in FIG. 8, for most of the data packet transmission, only the in-phase component of the carrier is modulated. Thus, the phase of the carrier is shifted between zero and 180 degrees depending upon the data. However, once per data packet, the in-phase component is set to zero and the quadrature ("QUAD") component is set to either positive or negative one, depending upon the data. In FIG. 8, a data value of zero occurs during the synchronization pulse. This results in a phase shift of the carrier to 270 degrees. If the data had been one during the synchronization pulse, the phase would have moved to 90 degrees.

A down counter (not shown) in the microprocessor 216 maintains a variable to keep track of the number of complete 18-bit data words that have been transmitted to the transceiver 108. When down counter indicates that ten pressure data words have been transmitted to the transceiver 108, the variable changes value and the transponder 104 stops measuring from the pressure sensor and begins measuring from the temperature sensor. After ten temperature data words have been transmitted, the transponder switches back to measuring the pressure sensor.

The down counter described above is set to a number of different values depending upon the state of the program. Upon reset, the down counter is set to zero so that the first time the ISR is entered after reset, the microprocessor checks to see if the voltage is high enough to perform an ADC conversion (the sensors 220 and 224 need 5.0 volts d.c. or greater for operation). This would allow the transponder 104 to immediately send out valid data provided that the power supply is adequate to perform an ADC conversion.

The microprocessor also employs a transponder On-Acquire-Sensor software algorithm ("OAS"). OAS selects which sensor (pressure or temperature) to sample, and then completes the sampling of that sensor. The OAS differentially encodes the resulting sensor value. During the ensuing ADC conversion, the microprocessor 216 is put into sleep mode to conserve power.

The sensors 220 and 224 are also disabled when not being sampled. In order to sample a sensor, the sensor 220 or 224 must be enabled and a period of time must elapse before it is actually sampled. This time delay allows the sensor 220 or 224 to settle to a steady state value.

Since currently both the pressure and temperature synchronization patterns are fixed values and can be differentially encoded before run-time, the only data that need be differentially encoded at run-time are the sensor ADC values. This differential encoding is done by table look-up. The look-up table contains 128 entries that represent the differentially encoded value of the input data as described above. Whenever a data "1" is detected, the phase of the carrier signal is shifted 180 degrees to indicate to the transceiver that the data bit is a "1".

The data output from the microprocessor 216 at 11.25 kHz and the 90 kHz carrier signal output from the frequency divider 204 are multiplied by XOR gate 244 to generate a modulation signal. The modulation signal is a BPSK signal at 90 kHz and is used to control switches 288 and 332 to convert the BPSK signal to a QPSK signal at 90 kHz. The modulation signal causes the switch 288 to open and close on alternating peaks of the 180 kHz drive signal. Data consisting of pressure and temperature values and synchronization information is "sent" to the antenna coil 124 by closing switch 288 on either the earlier or later set of alternating peaks. The quadrature pulse is "sent" to antenna coil 124 by closing switch 332. Whenever switch 332 is closed, energy stored in the resonant circuit formed by coil 124 and capacitor 180 lost to the virtual ground 184.

As long as the transceiver 108 is inductively coupled to the transponder 104, energy is constantly being transferred from the transceiver coil 380 to the transponder antenna coil 124. The 180 kHz input signal is rectified by diode 280. Whenever the switch 288 is closed, the resulting rectified voltage is stored in capacitor to provide power to the transponder components. When the switch 288 is open, the transferred energy is stored in the resonant circuit formed by antenna coil 124 and capacitor 180 until the next time that switch 288 is closed.

At the same time, and still assuming that the transponder 104 and transceiver 108 are inductively coupled, data is continuously transferred from the transponder 104 to the transceiver 108. As stated above, the transponder 104 generates a large modulated analog QPSK signal at one half the drive frequency. The QPSK signal is received by the stationary coil 380, passes back through the H-bridge filter 388, and is transferred to the down converter 484. The down converter 484 multiplies the received 90 kHz carrier by the 90 kHz transceiver reference signal The output of the down converter 484 consists of two channels that contain the modulation information that was present on the received 90 kHz carrier. The two channels are commonly referred to as the In-phase ("I") and Quadrature ("QN") channels.

The I and Q channels are digitized using Analog to Digital converter (A/D). The digital signals are then sent to the digital signal processor 448. The digital signal processor 448 performs all the processing to demodulate the signal, convert it to data, check the data, and output the digital value that was sent by the transponder 104.

The digital signal processor 448 checks the data to ensure: that the data has a minimum signal threshold that is greater than 75% of the average amplitude of all data received during the last one second period; that the synchronization bit in the Q-channel is at least twice the signal level of the I-channel; that the data transmitted does not include part of a pressure data packet mixed with part of a temperature data packet; that all of the synchronization bits are correct; that the data is less than five seconds old; and that the standard deviation of the data is less than approximately one pound per square inch. The system 100 could also be programmed to perform many other tests or manipulations of the data.

The output of the digital signal processor 448 is the data received from the transponder 104. The digital signal processor 448 checks the data for errors. If a data packet contains errors, the data packet is discarded and the next data packet is used. As discussed above, each data packet contains a temperature or pressure value, plus error detection and synchronization bits. The loss of one or even several data packets does not significantly affect performance of the system 100. This is because the system 100 can transfer many data packets during one wheel revolution at low vehicle speeds. As vehicle speed increases, fewer packets can be transferred per revolution, but the coils 124 and 380 pass each other, i.e., are inductively coupled, more often. Thus, the average data packet transfer rate is 15 pressure and 15 temperature packets per second. The packet rate is only slightly dependent on wheel RPM.

If there are no errors for a given data packet, then the data is formatted, and, if necessary, is sent to the digital to analog ("D/A") converter. The D/A converter is only used for interfacing to systems that can not accept a digital value. In either the analog or digital form, the data can be transmitted to a system for displaying the correct tire pressure for each tire on a readable display mounted inside the passenger compartment of the vehicle 10.

Figure 6:
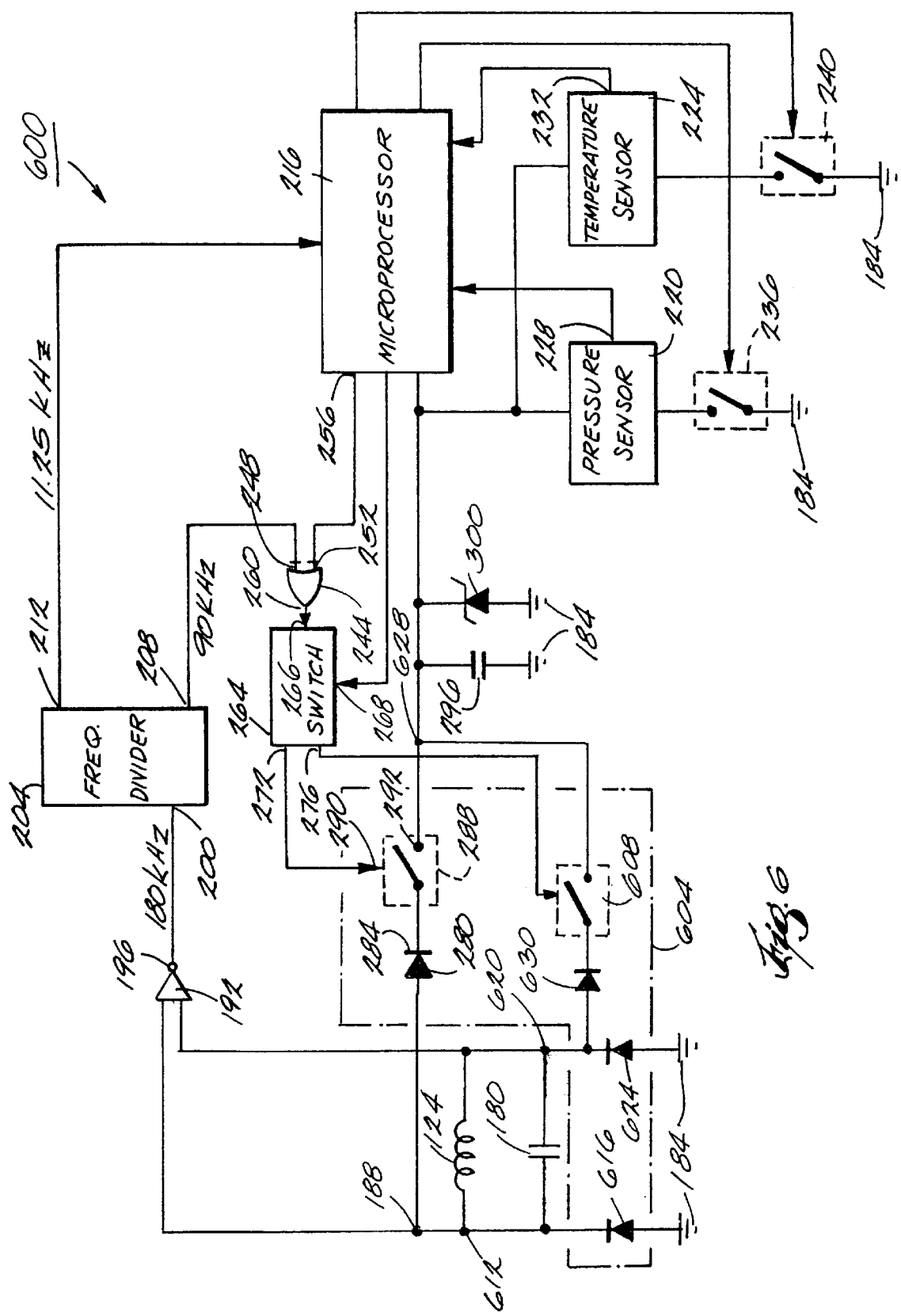
FIG. 6 is an electrical schematic diagram of a transponder that is another embodiment of the invention.

FIG. 6 illustrates a portion of a transponder 600 that is another embodiment of the invention. The transponder 600 is identical to the transponder 104 except for the modulation block 604 shown in FIG. 6.

Like parts or components are identified using like reference numerals. Like the modulation block 304, the modulation block 604 shown in FIG. 6 is also a quadrature phase shift keyed ("QPSK") modulation block. The modulation block 604 includes switch 608 connected to the output 276 of switch select controller 264. As shown in FIG. 6, the node 612 of the parallel combination of antenna 124 and capacitor 180 is connected to ground 184 through diode 616. Likewise, the node 620 of the parallel combination of antenna 124 and capacitor 180 is connected to ground through diode 624. Node 620 is connected to node 628 through diode 630 and switch 608.

In operation, data is encoded the same as in the transponder 104. However, energy stored in the resonant circuit formed by coil 124 and capacitor 180 is transferred to the capacitor 296 whenever switch 608 is closed. This additional energy transfer makes the transponder 600 more efficient than transponder 104.

Figure 7:
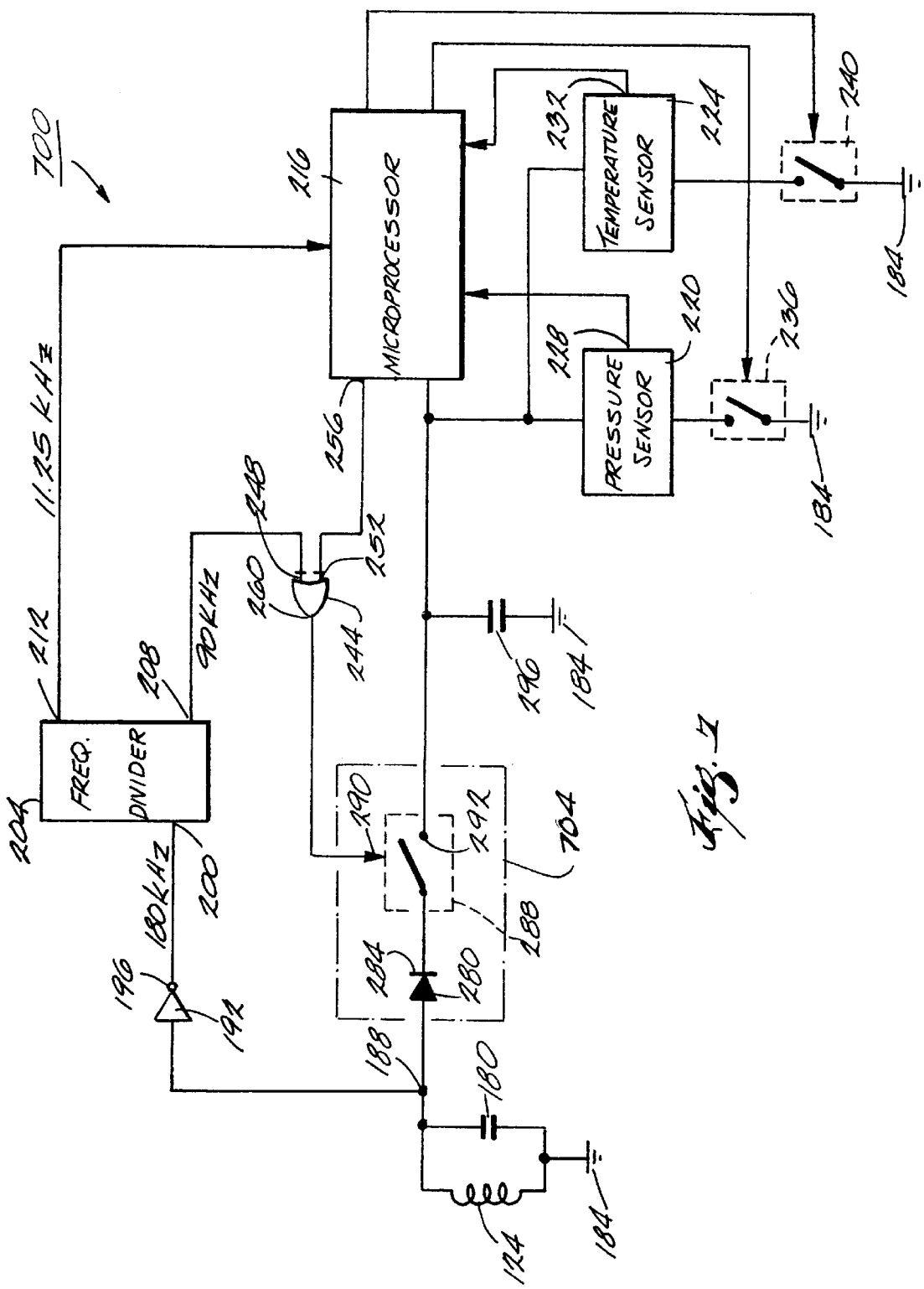
FIG. 7 is an electrical schematic diagram of a transponder that is a third embodiment of the invention.

FIG. 7 illustrates a portion of a transponder 700 that is another embodiment of the invention. The transponder 700 is identical to the transponder 104 except for the modulation block 704 shown in FIG. 7. The modulation block 704 is a bi-polar phase shift keyed ("BPSK") modulation block. As is commonly known in the art, BPSK modulation is a "sub-set" of QPSK modulation. In particular, BPSK modulation uses only the I-channel to encode and transmit data. Therefore, there is no Q-channel transmitted and any synchronization or reference bits must be encoded in the I-channel.

Other features of the advantages and invention are set forth in the following claims.

What is claimed is:

1. A method of transmitting data between two inductively coupled circuits, said method comprising the steps of:

(a) providing a transmitting circuit;

(b) providing a receiving circuit spaced from said transmitting circuit; and (c) generating a data signal in said transmitting circuit, said data signal including a first component representing said data and having a phase, and a second component identifying said first component and having a phase that is shifted a predetermined amount with respect to said phase of said first component.

2. A method as set forth in claim 1 and further comprising the step of inductively coupling said transmitting circuit and said receiving circuit to transfer said data signal across the space between said transmitting circuit and said receiving circuit.

3. A method as set forth in claim 1 wherein said step (C) further includes the step of (D) generating an oscillating drive signal in said transmitting circuit and (E) generating a data carrier signal synchronized to said oscillating drive signal, said data carrier signal including said data signal.

4. An apparatus comprising:

a transmitting circuit including a transmitting coil, said transmitting circuit generating electrical energy in said transmitting coil; and a receiving circuit spaced from and inductively coupled to said transmitting circuit, said receiving circuit including modulating means for generating a carrier signal including a first component encoding a plurality of consecutive data signals and having a phase, and a second component identifying the beginning of respective ones of said data signals and having a phase that is shifted a predetermined amount with respect to said phase of said first component.

5. An apparatus as set forth in claim 4 wherein said transmitting circuit includes a demodulator connected to said transmitting coil for decoding said carrier signal.

6. An apparatus as set forth in claim 4 wherein said carrier signal is quadrature phase shift keyed.

7. An apparatus as set forth in claim 4 wherein said carrier signal is bi-polar phase shift keyed.

8. An apparatus as set forth in claim 4, wherein said receiving circuit receives a portion of the electrical energy generated in said transmitting coil, and wherein said receiving circuit is powered by said portion of the electrical energy.

9. An apparatus as set forth in claim 4, wherein said receiving circuit continually transmits said carrier signal to said transmitting circuit when said receiving circuit is inductively coupled to said transmitting circuit.

* * * * *